UNITED STATES PATENT OFFICE.

WINFIELD SCOTT, OF AKRON, OHIO, ASSIGNOR TO THE GOODYEAR TIRE & RUBBER COMPANY, OF AKRON, OHIO, A CORPORATION OF OHIO.

VULCANIZED CAOUTCHOUC AND ART OF PRODUCING THE SAME.

1,356,495.     Specification of Letters Patent.     Patented Oct. 19, 1920.

No Drawing.     Application filed November 10, 1919. Serial No. 337,040.

*To all whom it may concern:*

Be it known that I, WINFIELD SCOTT, a citizen of the United States, and resident of Akron, Ohio, have invented new and useful Improvements in Vulvanized Caoutchouc and Art of Producing the Same, of which the following is a specification.

My invention relates to vulcanized caoutchouc substances and to the art of producing the same, and it will be fully understood from the following specification.

My invention is particularly directed to the art of accelerating or increasing the action of a vulcanizing or curing agent used in the vulcanization of either natural or synthetic caoutchouc by causing the vulcanizing agent to react more quickly, hence, shortening the time during which it is necessary to maintain the rubber in a heated condition.

I have discovered that certain substituted thio-ureas, obtained from primary aromatic amins containing hydrocarbon residues, otherwise known as hydrocarbon or alkyl groups, more particularly those substituted thio-ureas produced by the reaction of carbon bisulfid with aromatic amins having an alkyl substituent in ortho position, which class of substituted thio-ureas may be otherwise defined as aryl substituted thio-ureas having an alkyl group in ortho position to the nitrogen of the thio-urea, have the desired property, when used as " accelerators," of effecting a cure in a relatively short period of time.

Since the accelerators, of the class with which my invention is concerned, are so comparatively rapid in their action, it follows, that a smaller relative quantity of any such accelerator can be used than would be necessary of other known accelerators, and will produce furthermore, a vulcanized caoutchouc of as good quality as, or superior to that obtained by the use of known accelerators.

The class of chemical compounds to which accelerators contemplated in my invention belong, may be represented by the following formula:

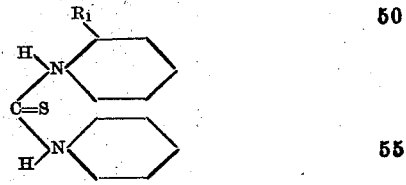

wherein $R_1$ may be any hydrocarbon or alkyl radical, as $CH_3$. The hydrocarbon or alkyl radical may, of course, be either in one phenyl group as indicated in the formula above shown, or in both phenyl groups; for example, symmetrical di-orthotolyl thiourea having the formula:

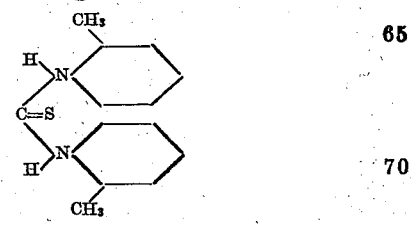

The compounds included in this group are usually most advantageously produced by causing carbon bisulfid $(CS_2)$ to react with an aromatic amin having an alkyl substituent in ortho position. Such a group of aromatic amins includes amido-poly-alkyl-benzenes, as the xylidins, aminocymenes and cumidins.

It will be understood that the aromatic amins referred to are in general derivatives of anilin $(C_6H_5NH_2)$.

The preferred process of carrying out my invention may be illustrated in the following example:

50 parts of smoked sheet rubber, 45.5 parts of zinc oxid (ZnO), 3.5 parts of sulfur (S), and 1 part of diortho-tolyl-thiourea are mixed together and cured by heat; the latter being usually produced by steam under pressure.

If the steam pressure be 40 lbs. the time of producing a cured or vulcanized rubber of a quality superior to that obtained by the use of the same proportion of thio-carbanilid or anilin from forty-five minutes to two hours, will be about ten minutes.

On the other hand, if the steam pressure be reduced below 40 lbs. and the curing temperature thus correspondingly lowered, the time of the cure will be increased, but the superiority of the vulcanized product will still be maintained, when an accelerator of my invention is utilized.

The process may therefore also be carried out as follows:

A mixture of 50 parts of smoked sheet rubber, 45.5 parts zinc oxid (ZnO) 3.5 parts of sulfur (S) and 1 part of di-ortho-tolyl-thio-urea is made and then cured at 10 lbs. steam pressure. The best cure is effected in about sixty minutes.

While I have mentioned zinc oxid as the filler and sulfur as the vulcanizing agent in the preceding examples, either or both may, if desired, be replaced by other ingredients having the same general functions respectively.

It will thus be apparent that three of the factors involved in the vulcanization of caoutchouc, viz. time, temperature, and the proportion of accelerator used, may, when accelerators of the class referred to are used, be so varied as to effect economy of time, heat, and amount of accelerator, and at the same time produce a product of superior quality. This is accomplished, furthermore, without the danger of over-curing the product, if the cure be carried out in the relatively longer time period.

It will be at once evident, to those skilled in the art, that di-ortho-tolyl-thio-urea referred to in my examples, is the reaction product of carbon bisulfid ($CS_2$) with ortho-toluidin ($C_6H_4(CH_3)NH_2$).

While I have given specific examples of procedure and have mentioned, di-ortho-tolyl-thio-urea, as one of the preferred accelerators of the class, used in a rubber compond including zinc oxid and sulfur, it will be understood that I do not regard the invention as dependent on the specific procedure or materials mentioned, except in so far as such limitations are included within the terms of the claims hereto annexed, in which it is my intention to claim all inherent novelty in my invention as broadly as is possible in view of the prior art.

What I claim is:

1. The process of effecting the vulcanization of caoutchouc which consists in incorporating with a caoutchouc mix an aryl substituted thio-urea accelerator having an alkyl group in ortho position and then vulcanizing the mix.

2. The process of effecting the vulcanization of caoutchouc which consists in incorporating with a caoutchouc mix an ortho-tolyl-thio-urea and then vulcanizing the mix.

3. The process of effecting the vulcanization of caoutchouc which consists in incorporating with a caoutchouc mix di-ortho-tolyl-thio-urea and then vulcanizing the mix.

4. The process of effecting the vulcanization of caoutchouc, which consists in incorporating in the caoutchouc mix a substituted thio urea accelerator having an alkyl group in ortho position and derived from a primary aromatic amin, and then vulcanizing the mix.

5. The process of effecting the vulcanization of caoutchouc, which consists in incorporating in the caoutchouc mix a substituted thio-urea accelerator having a methyl group in ortho position and derived from a primary aromatic amin and then vulcanizing the mix.

6. The process of vulcanizing caoutchouc which consists in first bringing together under reacting conditions carbon-bisulfid and an aromatic amin having an alkyl substituent in ortho position and subsequently incorporating the substituted thio-urea thus produced, in the caoutchouc mix, and vulcanizing the mix.

7. The process of vulcanizing caoutchouc which consists in first bringing together under reacting conditions carbon-bisulfid and ortho-toluidin and subsequently incorporating the substituted thio-urea thus produced in the caoutchouc mix and vulcanizing the mix.

8. The process of effecting the vulcanization of caoutchouc, which consists in incorporating in the caoutchouc mix a substituted thio-urea accelerator derived from ortho-toluidin and then vulcanizing the mix.

9. The process of effecting the vulcanization of caoutchouc, which consists in mixing with caoutchouc, zinc oxid, a vulcanizing agent and an aryl substituted thio-urea accelerator having an alkyl group in ortho position, and then vulcanizing the mix.

10. A vulcanized caoutchouc product produced by the reaction of caoutchouc, a vulcanizing agent and an aryl substituted thio-urea accelerator having an alkyl group in ortho position.

11. A vulcanized caoutchouc product produced by the reaction of caoutchouc, a vulcanizing agent and ortho-tolyl thio-urea as an accelerator.

12. A vulcanized caoutchouc product produced by the reaction of caoutchouc, a vulcanizing agent and di-ortho-tolyl-thio-urea as an accelerator.

13. A vulcanized caoutchouc product produced by the reaction of caoutchouc, a vulcanizing agent and a substituted thio-urea accelerator having an alkyl group in ortho position and derived from a primary aromatic amin.

14. A vulcanized caoutchouc product produced by the reaction of caoutchouc, a vulcanizing agent and a substituted thio-urea accelerator having a methyl group in ortho position and derived from a primary aromatic amin.

15. A vulcanized caoutchouc product produced by the reaction of caoutchouc, a vulcanizing agent and a substituted thio-urea accelerator derived from ortho-toluidin.

16. A vulcanized caoutchouc product produced by the reaction of caoutchouc, a vulcanizing agent and an accelerator including a carbon-bisulfid reaction product with an aromatic amin having an alkyl substituent in ortho position.

17. A vulcanized caoutchouc product produced by the reaction of caoutchouc, a vulcanizing agent and an accelerator including a carbon-bisulfid reaction product with ortho-toluidin.

18. A vulcanized caoutchouc product produced by the reaction of caoutchouc zinc oxid, a vulcanizing agent and a substituted thio-urea having an alkyl group in ortho position.

19. A vulcanized caoutchouc product produced by the reaction of caoutchouc, zinc oxid, a vulcanizing agent and an aryl substituted thio-urea having an alkyl group in ortho position.

In witness whereof, I have hereunto signed my name in the presence of two subscribing witnesses.

WINFIELD SCOTT.

Witnesses:
J. E. KEATING,
PHILIP E. BARNES.